(12) United States Patent
Antikidis

(10) Patent No.: US 10,497,286 B2
(45) Date of Patent: Dec. 3, 2019

(54) METHOD FOR CREATING MAPS BY RANDOM PROCESSING OF DATA RECEIVED FROM MOVING SENSORS

(71) Applicant: Jean-Pierre Antikidis, Castanet (FR)

(72) Inventor: Jean-Pierre Antikidis, Castanet (FR)

(*) Notice: Subject to any disclaimer, the term of this patent is extended or adjusted under 35 U.S.C. 154(b) by 199 days.

(21) Appl. No.: 15/504,685

(22) PCT Filed: Aug. 13, 2015

(86) PCT No.: PCT/EP2015/068708
§ 371 (c)(1),
(2) Date: Feb. 17, 2017

(87) PCT Pub. No.: WO2016/026773
PCT Pub. Date: Feb. 25, 2016

(65) Prior Publication Data
US 2017/0263161 A1     Sep. 14, 2017

(30) Foreign Application Priority Data

Aug. 18, 2014  (FR) ...................................... 14 57856

(51) Int. Cl.
*G06Q 10/10*      (2012.01)
*G09B 29/10*     (2006.01)
*G09B 29/00*     (2006.01)

(52) U.S. Cl.
CPC ......... *G09B 29/106* (2013.01); *G09B 29/003* (2013.01)

(58) Field of Classification Search
CPC ..... G09B 29/106; G09B 29/003; G06Q 10/10
See application file for complete search history.

(56) References Cited

U.S. PATENT DOCUMENTS 8,565,670 B2   10/2013  Antikidis
2006/0077096 A1  4/2006  King et al.
(Continued)

FOREIGN PATENT DOCUMENTS

WO   2010/037939 A1   4/2010
WO   2010/128295 A1   11/2010

OTHER PUBLICATIONS

Teo et al., Distributed Geo-Rectification of Satellite Images Using Grid Computing, Jul. 28, 2003, Proceedings International Parallel and Distributed Processing Symposium, 8 pp. (Year: 2003).*

(Continued)

*Primary Examiner* — Toan M Le
(74) *Attorney, Agent, or Firm* — Pearne & Gordon LLP

(57) ABSTRACT

The application concerns a method for creating maps in an automatic manner using sub-maps created randomly and combined by statistical accumulation. The measurements from information sensors, positioned on mobile platforms, are sent to reception means disposed randomly and independent of each other and transmitting the received information to a random computer processing layer. The random processing layer, creates within same random sub-maps as the information received by the computer network becomes available, the random sub-maps being dispersed arbitrarily in the random processing layer, access pointers being associated with the random sub-maps in order to make it possible to find them. An organising layer, using the access pointers, carries out the statistical recombination of the random sub-maps dispersed in the random processing layer with a view to reconstructing the desired final map or maps. The method according to the application, in one of the applications of same, is particularly useful for the economical and swift creation of complex maps with very large coverage, as (Continued)

required to monitor a country, the resources of same or the economic activity thereof.

12 Claims, 3 Drawing Sheets

(56) References Cited

U.S. PATENT DOCUMENTS

| | | | |
|---|---|---|---|
| 2010/0309313 A1* | 12/2010 | Antikidis | B64G 1/1021 348/144 |
| 2011/0187860 A1* | 8/2011 | Antikidis | H04N 19/12 348/144 |
| 2011/0188548 A1 | 8/2011 | Antikidis | |
| 2011/0206096 A1* | 8/2011 | Antikidis | H04B 7/18578 375/211 |

OTHER PUBLICATIONS

Abstract of Teo et al., Jul. 28, 2003, 1 pp. (Year: 2003).*
Teo, et al.; "Distributed Geo-rectification of Satellite Images using Grid Computing"; Parallel and Distributed Processing Symposium; pp. 15-22; Dated Apr. 4, 2003.
International Search Report from Corresponding Application No. PCT/EP2015/068708; dated Oct. 19, 2015.
English Translation of International Preliminary Report on Patentability from Corresponding Application No. PCT/EP2015/068708; dated Feb. 12, 2017.
European Search Report dated Dec. 4, 2017 for corresponding European Application No. 15 756 128.3.

* cited by examiner

METHOD FOR CREATING MAPS BY RANDOM PROCESSING OF DATA RECEIVED FROM MOVING SENSORS

FIELD OF THE INVENTION

The invention concerns a method for creating maps from measurements collected by one or more mobile information sensors the information from which is not centralized as is usually done, but utilizes a new methodology whereby a map is reconstructed by the statistical combination of submaps created randomly within an array of computers.

BACKGROUND OF THE INVENTION

A map (FIG. 1) is a collection of measurement points defined by any number of measurements associated with geographical coordinates.

In the case of the present patent a map is defined as the combination of all the measurements (observation data) ordered so as to cover a given geographical zone or any surface described by a set of measurements referenced by spatial coordinates with from 1 to 3 dimensions.

For example, a conventional geographical map is a series of measurements transferred onto a two-dimensional plane surface (this involves a procedure for projecting a set of three-dimensional measurements onto a plane surface, because the Earth is not flat).

In the context of the invention, what is of interest is how a set of measurements collected by mobile sensors (persons, vehicles, aircraft or satellites) can be collected together as effectively and as economically as possible, in particular when the quantity of measurements collected becomes very large and the mobile sensors are disposed over a very large area.

If what is of interest is mapping the terrestrial globe as a whole and with a high refresh rate, for example, the analysis of the problem typically leads to practical impossibilities or to processing loads that render capture, for example of the whole of the planet, impracticable in the current state of the art.

For example: a color image of the globe at a sample resolution of the order of 33 cm (which is the resolution of many classic airborne imaging systems) corresponds to: $5.1 \times 10^{14}$ m$^2$ i.e. approximately $5 \times 10^{15}$ samples. Assuming that each of the measurement samples is coded with three colors each on 256 levels (coded on three bytes), this represents in all approximately $1.5 \times 10^{16}$ bytes to be refreshed daily, which no present day computer centre knows how to process within an acceptable time frame and/or at an acceptable cost.

It is absolutely impossible to manage this amount of data using classic computation means. Not only because of the large volume involved but also and above all because of the impossibility of repatriating this information in a given place, given that it is acquired by sensors that can be moving over the whole of the planet in some applications.

The paper by Y. M. Teo et al. entitled "Distributed geo-rectification of satellite images using Grid computing" in PARALLEL AND DISTRIBUTED PROCESSING SYMPOSIUM, 2003. PROCEEDINGS INTERNATIONAL, Apr. 22-26, 2003, PISCATAWAY, N.J., USA, IEEE, (2003 Apr. 22), pages 15-22, XP010645301, ISBN: 978-0-7695-1926-5, describes a classic example of the application of parallel processing in a GRID, and therefore predictably and deterministically.

The method described in the above paper necessitates the use of two distinct mechanisms including a "Task Generator" that must absolutely have an exact and deterministic knowledge of the breakdown created (otherwise it will not be possible to group the information together) and a "Result Collector", which must have a perfect and deterministic knowledge of the breakdowns effected by the Task Generator.

BRIEF SUMMARY OF THE INVENTION

The invention concerns a method and means for implementing that method making it possible, without recourse to costly means, to create a map stemming from an extraordinarily large series of measurements that can be accessed and used easily by any user to create any map that suits them.

The key to this method consists in abandoning the idea of a deterministic and controlled processing process that is classically used through the known mosaic technique in which the received cartographic data is centralized and added to produce a map, in favor of a creation logic by statistical accumulation of "submaps" produced randomly and dispersed within a computer network but the combination of which finally produces the required result without it being necessary to know where and when the so-called "random" submaps are produced.

This new method that constitutes the subject matter of the present invention proves particularly fertile in practice because the application of the "random submap" concept is particularly suited to new computer concepts of the present day such as distributed computing systems known in the art as "cloud computing" characterized by the use of interconnected computer networks the operation of which no longer depends on the computing topology used. Although the proposed methodology of intentional creation of random submaps in order to process them afterwards by a reconstruction method that is also random can be implemented using any computing system, it is found that the combination of the methodology that is the subject matter of the present invention with "cloud" type computing means is particularly effective for managing a dispersed set of random submaps created by the methodology of the invention.

To produce a map from mobile sensors, i.e. to create a representation in a two-dimensional or three-dimensional measurement space, the following components are classically associated:

A (generally classic) information acquisition system with one or more sensors, coordinated with one another or not, adapted to effect measurements (this generally means Earth observation data, in particular images) and to communicate the result in the form of a set of the form: M(x,y,z) M (1) being conceptually a measurement set issuing from sensors. A typical example concerns an aircraft carrying a video camera and taking color photos of the ground intended to be combined to produce the map of a town or a larger area that could be a region, a country or even the terrestrial globe in its entirety.

The map may be terrestrial but equally well non-terrestrial or the result of radio-electric observation. As a general rule, one or more mobile platforms transport the sensor or sensors in order to cover a given area (in fact make it possible to connect the temporal information to the position via the trajectory equation of the form M(x,y,z)=f(t) where M is value of the measurement intended to form the desired map, x,y,z are the coordinates of the measured point, and t is the measurement time.

Sending means making it possible to transmit to receiving means, more or less continuously, a radiofrequency or optical link bearing information from the sensor from its platform.

One or more receiving means adapted to collect the information collected by the sensor(s).

In accordance with the present method, processing means are employed to process the sparse information received by the stations, which means according to the present invention employ a new random methodology comprising:

A random processing layer breaking down into multiple random submaps the sparse information that may issue from multiple sensors onboard multiple platforms dispersed in time and in space. The random submaps are dispersed in the random processing layer in any manner and access pointers are associated with the random submaps to make it possible to retrieve the random submaps.

An organizing layer enabling access to the random submaps processed in the above manner to obtain the required final map accessible as a coherent and perfectly ordered set, using access pointers for the statistical recombination (110, 111) of the dispersed random submaps.

The existing methods utilized at this time utilize configurations that may be summarized as follows with:

The "V" topology (FIG. 3). Concatenation of the received data to create the required map utilizes a centralized reception topology (the data is stored onboard the platform and downloaded when a reception system is accessible).

In this instance the data is repatriated "physically", ordered in a central site to then be easily accessed by any user.

A variant of the "V" topology concerns the utilization of a plurality of receiving means (71, 72, 73, 74, 75) able to collect at any point on their path the measurements issuing from the mobile platform, afterwards transmitting the result thereof to a central processing centre (31) responsible for combining them to create the required map (21).

The "V" topology, although easy to implement, runs up against enormous difficulties and prohibitive transmission costs as soon as the quantities of data and the distances become large.

The concentration of the information at one point and the need to repatriate everything creates insurmountable difficulties and prevents the production of maps covering a large territory within an acceptable timeframe.

A parade consists in dispersing the information in a plurality of processing centers (31, 32) but it then becomes very difficult to connect together the fragmentary maps created in this way.

The thrust of the needs of the information society to map the entire planet leads to requirements in terms of quantity of information exceeding the capacities of the largest present day processing centers. A "V" technology demands a costly local power and considerable transmission resources.

To counter these difficulties, so-called "X" topology (FIG. 4) "network" structures have been proposed in which a set of reception systems is organized in a communicating mesh and each node of the network is both a receiving node covering a corresponding geographical area associated with a processing system capable of creating the corresponding local submap.

The creation of the final map is not centralized; it is produced by combination of the information available in each centre (31, 32, 33, 34, 35). This network structure avoids having to concentrate the power or to repatriate the data at a single point, and constitutes a notable improvement.

However, although the "X" network principle is effective, it rapidly runs up against new limitations linked to the strict definition of the layouts of the geometry of the reception systems that must be geometrically organized to overlap one another.

Moreover, each reception system must contain a powerful processing system communicating with the other systems, which is costly when the number of reception systems increases.

Finally and most importantly it is impossible to move a receiving station without having to reconfigure the other stations to cover completely the map to be established and the loss of a reception system produces a gap in the coverage preventing access to a geographical area that the moving mobile sensor or the multitude of moving mobile sensors would nevertheless have covered.

The principle reason for the limitations of the "X" topology stems from the fact that the exchanges are deterministic with each system being capable of being substituted for another system and in the event of losses sometimes makes the production of the required map impossible.

In the case of the present invention, the problem arising is solved by the use of a method in which the recovery of the data and the relation thereof to create a map is much more effective by virtue of using a mechanism in which the capture, processing and grouping of the information are effected by a statistical random process able easily to use connection topologies that are also non-deterministic and random. This method makes it possible to circumvent doubly the limitations of the "X" configuration given that the physical layout of the receiving means may be of any kind and even variable. The same applies to the processing means, which no longer have to be localized or connected to the receiving means in a known and stable manner.

The method of the invention has been conceived to improve the performance of the "X" topologies in combination with the simplicity and the reliability of the "V" topology. It relies on the use of so-called "random" topologies able to use the sum of two operating topologies each of which is random: any organization of the reception systems that can be combined with an organization of computers also connected in any manner and producing and hosting submaps in a random manner (FIG. 5).

In the context of the present invention, "random" means that the topology of the processing or communication means installation is neither deterministic nor known. This does not rule out the so-called "random" system being able to behave in a known manner.

To this end the sensor data received from the mobile platforms is collected by one or more reception systems and transmitted to a series of interconnected computers each of which or groups of which create(s) so-called "random" submaps covering areas that may be of variable size or even very small.

For example, the information sensor or sensors of one or more mobile platforms cover(s) continuously a certain area (which may be that of the Earth) and transmits its or their measurements to the receiving means as and when made and the random processing layer creates at random and as when this information is available random submaps representing fractions of the area covered by the moving sensor.

The multitude of these submaps distributed randomly in the network as and when data issuing from the mobile sensors arrives may then be combined by statistical accumulation to create any required map. Although it is not possible to know when the final map will be obtained, the result is necessarily acquired after a time depending on the computing performance of the network.

To simplify considerably, the essential point of the present invention is to transform a set of more or less fragmented maps obtained by mobile sensors into a much larger set of random submaps deliberately created by intentional random breaking down of the received data (maps/images) in order to disperse them in a random processing layer that is also distributed. The size of the submaps created in this way, although random and defined by the processing layer, is in theory very small compared to the images received by the processing layer in order to make possible a maximum dispersion of the information facilitating reconstruction by random combination (typically between $1/1,000$ and $1/10,000,000$).

In practice, the data received by receiving means and transmitted to the random layer is broken down/fragmented into submaps of variable size that can typically contain from 100 to 100,000,000 measurement points. Moreover, the number of points describing the characteristics specific to each submap, including their size and their position, may be between 10 and 1 000 000 inclusive, the system therefore comprising as many pointers as submaps, and the pointers being employed with a view to utilizing the submaps without needing to reconstruct it.

The grouping into a final map (the required map) that is coherent and complete is achieved by the dispersed processing of the random submaps the referencing and marking of which (rather than the mere accumulation of the measured values as in the classic "statistical smoothing" methods) enables reconstruction in virtual form (by association of the pointers of the random submaps) or if necessary in real form (by repatriation of the submaps using the pointers created during the processing phase).

The intellectual analogy with thermodynamics or crystallographic constructions or random processes generating deterministic effects or the principles of computation based on the Monte-Carlo method should be pointed out.

The consequences of a novel method of operation of this kind are extremely interesting, with:
    the elimination of the constraints on the placement of the receiving means, in contrast to existing known "V" or "X" configurations,
    the use of transmission bandwidths that are more effective because they can be shared across any number of reception systems (and are no longer determined by their coverage geometry),
    the elimination of the obligation to perform processing at the level of the receiving layer, which renders the placement of said receiving means particularly economical,
    finally, through the systematic and automatic creation of the random submaps as proposed by the method of the invention. It suffices to await the required map or maps through the simple effect of statistical combination.

Distributing randomly the load of producing the submaps makes it possible to demultiply infinitely the power necessary to establish the required final map. Nor is it any longer necessary to monitor the processing processes because they are effected automatically, bit by bit and autonomously in the processing layer. In the case of the invention, the map creation process is effected without any particular monitoring requirement, the only counterpart being that the time to produce the set of submaps is no longer predictable because it depends only on the performance statistic of the random processing layer. On the other hand, by waiting the necessary time the required map is always received, as soon as the platforms and their sensors have acquired the measurements necessary to create the required map.

One particularly effective implementation of the invention concerns the creation of virtual mapping globes combining a topology of receiving antennas distributed randomly (or at least with no particular localization constraint) combined with the ingestion of the received streams in a so-called "cloud" system known in the computing prior art when the disposition and the organization of the computing means utilized are not deemed known.

Moreover, in this case the invention proves itself very powerful given that the map users no longer need even to request the supply of the maps in "physical" form because they can also use them for their own purposes within the so-called "cloud" system.

Another embodiment of the method of the invention provides the possibility of accumulating the random submaps issuing from a plurality of mobile systems carrying sensors of different kinds in order to create a final map combining them. This difficult problem in the case of known deterministic methods is solved simply and elegantly by allowing the submaps to accumulate stochastically and overlapping one another. For example optical sensors on some mobile systems and radar measurement sensors on other mobile systems of different kinds. This makes it possible to produce virtually automatically maps combining the two types of measurements in a single map.

Accordingly, variants of the present invention may have one or more of the following features:
    the organizing layer accumulates the random submaps by continuous statistical composition in order to enable the utilization of dispersed computing means the connection topology of which is not deemed known;
    the stochastic accumulation of the random submaps is utilized to enhance the final map either by averaging the random submaps or by selecting the freshest or those free of clouds;
    the information sensors consist of optical sensors, passive radiofrequency sensors (radiometers) or active radiofrequency sensors (radar);
    the receiving means are distributed worldwide in order to create a map covering the entirety or a significant fraction of the terrestrial globe;
    the information centers effect scientific measurements intended for the creation of maps with 2, 3 or more dimensions.

It will be noted with interest that the present method differs fundamentally from classic methods of parallel processing linked to the prior art known for more than 20 years concerning the utilization of computer systems known as "Turing machines" operating by means of submachines working in parallel but deterministically, that is to say in accordance with rules.

The parallel processing method consists in breaking the required task down into deterministic subtasks each confided to a Turing machine operating autonomously. On completion of the processing the results from each of the Turing machines are grouped into an appropriate result.

The present invention adopts a much more powerful new approach that utilizes the mathematical properties of so-called Monte-Carlo random methods making it possible to process in parallel data created randomly (and therefore, as in classic parallel computing, with no need to know deterministically or in a centralized manner the Turing machines created).

This "stochastic" approach is particularly novel and powerful because it makes it possible to process massive quantities of information without having to describe each of the processes contributing to the final result.

This is the case of complex distributed systems unable, for physical or temporal reasons, to describe deterministically the packets of data contributing to the parallelization of the processing.

This method applies particularly well to complex distributed space systems in which the data is scattered and ingested by systems the asynchronous operating mode topology of which does not make it possible to know when and how the spatial or temporal breakdown of the received information packets is organized.

By virtue of a cumulative and entirely stochastic effect, the result is created autonomously (and with no timing constraint) given that each of the packets of information carries with it its own description.

Another aspect of the invention also concerns a system and a program configured to implement the method described above.

BRIEF DESCRIPTION OF THE DRAWINGS

Other features and advantages of the invention will become apparent on reading the following detailed description, for an understanding of which reference will be made to the appended drawings showing the current state of the art (FIGS. 1, 2, 3 and 4) and a representation of one embodiment of the invention (FIG. 5).

DESCRIPTION OF EXAMPLE EMBODIMENTS

Figure 1:
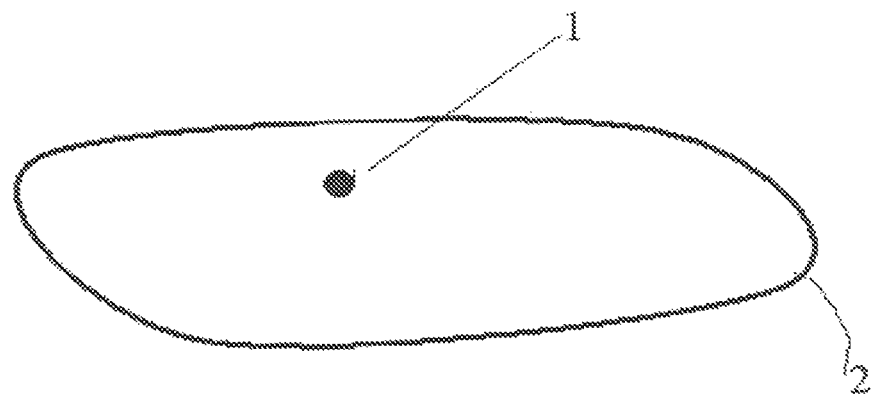
FIG. 1 shows the principle of producing a map (2) based on the collection of measurements (1) organized over a surface defined by a set of coordinates that can have from 1 to n dimensions. The most usual being two dimensions (plane map).
Figure 2:
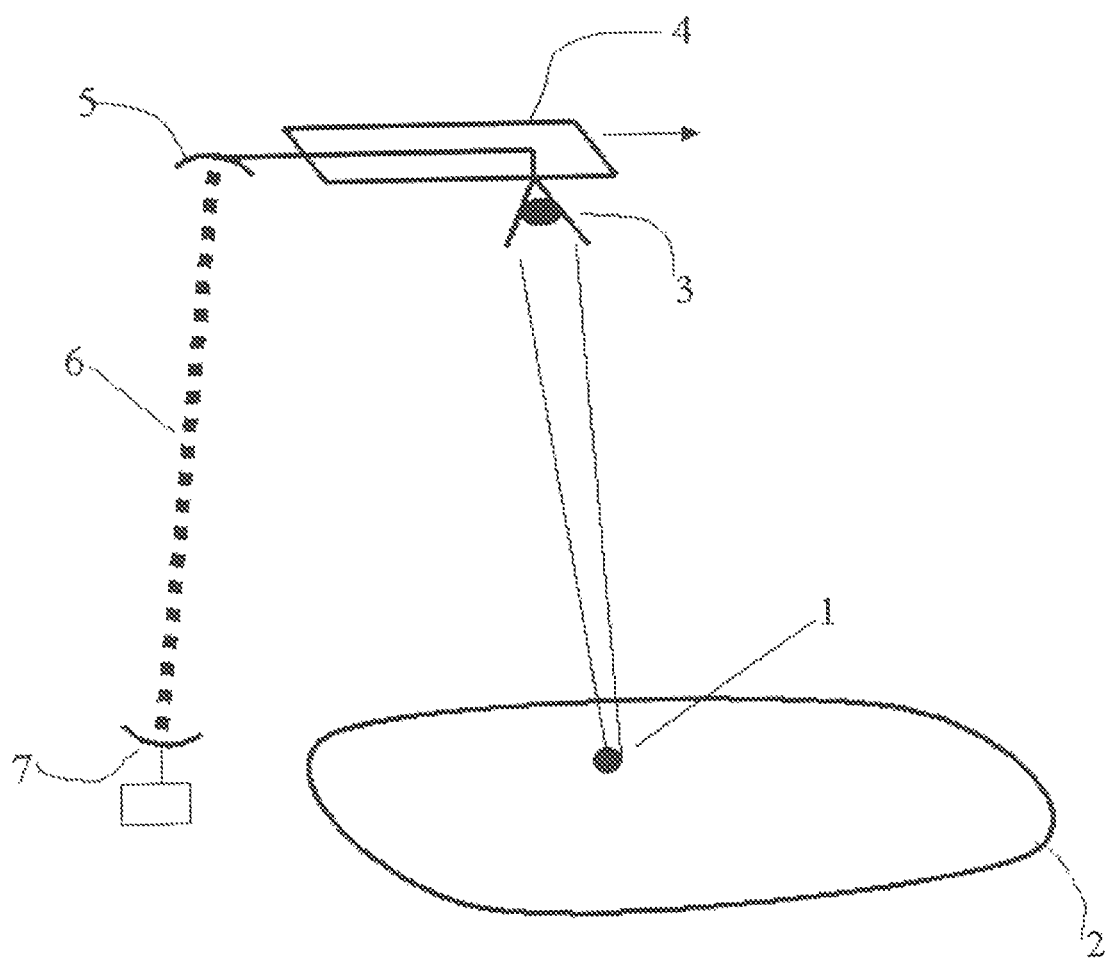
FIG. 2 shows the principle of acquisition of maps using a mobile platform (4) carrying a sensor (3) and using a radiofrequency transmitter (5) to transmit the measurements from said sensor to one or more radiofrequency receiving means (7).
Figure 3:
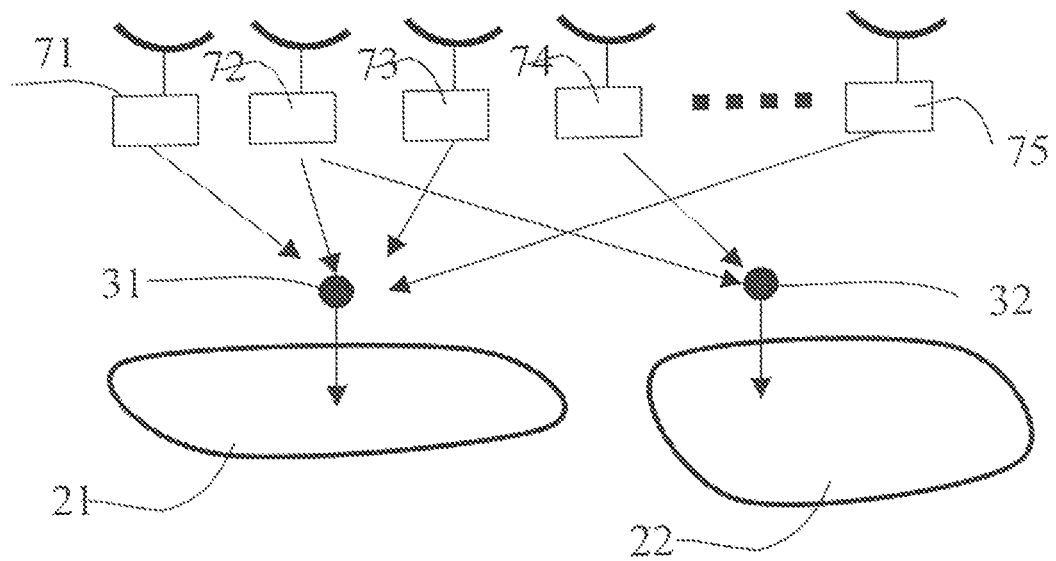
FIG. 3 illustrates the prior art with an example of creation of a map by direct additive reconstruction of measurements using a deterministic "V" topology in which the plurality of receiving means (71, 72, 73, 74, 75) centralize their information to a limited number of processing means (31, 32), most often less than ten in number, producing the required maps (21, 22).
Figure 4:
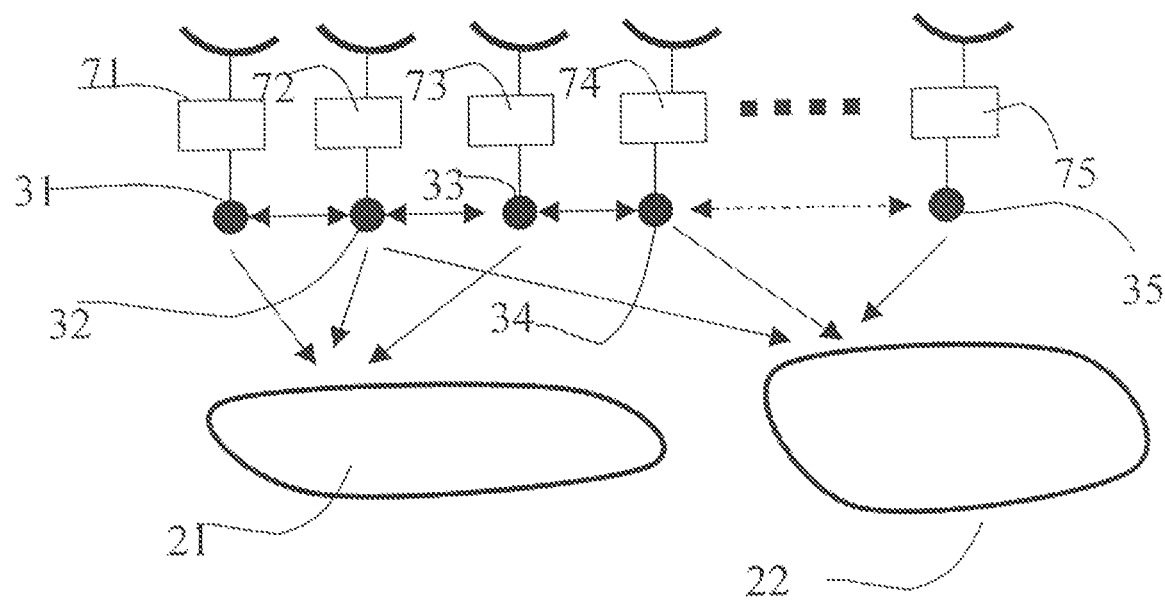
FIG. 4 illustrates the prior art with an example of creation of a map by distributed additive reconstruction in a network (deterministic "X" topology) in which the plurality of receiving means (71, 72, 73, 74, 75) exchange information received in accordance with a meshing of processing means (31, 32, 33, 34, 35) distributed geographically in order to cover the whole of the required map (21, 22).
Figure 5:
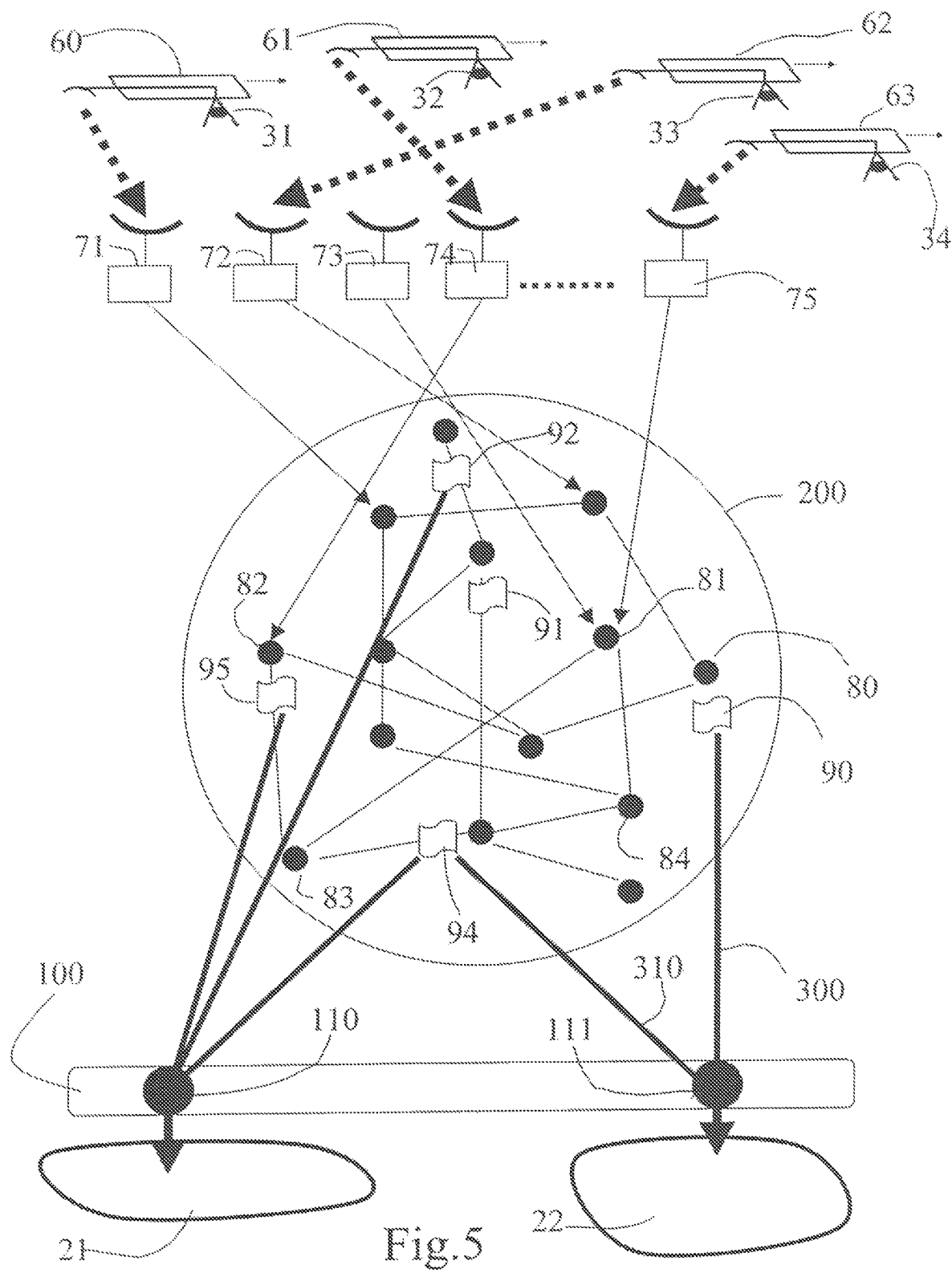
FIG. 5 describes one embodiment of the method of the invention utilizing a random submap creation topology. All the measurements collected by the sensors disposed on the platforms (60, 61, 62, 63) are transmitted to any of the radiofrequency reception systems (71, 72, 73, 74, 75) which in turn communicate them to one or more computers (80, 81, 82, 83, 84) constituting a distributed processing system (200) continuously and randomly creating the submaps (90, 91, 92, 93, 94, 95) dispersed in said processing system.

The submaps distributed in the system can be identified by computer pointers given that at the time of their creation there is also produced the information (300, 310) necessary for their subsequent statistical recombination by the integration layer (100) accumulating the random submap access information (also termed access pointers) (110, 111) as and when it is created. The access pointers are simple numerical values making it possible to know where the random submaps and their geometries are physically located. The reconstruction of a final map therefore does not necessarily make it obligatory to extract the content of the random submaps and may possibly be limited to collating a set of pointers making it possible to retrieve the map. This method proves particularly effective in the case of Internet-based systems where this mode of operation based on pointers (e.g. html) is very common.

The invention can therefore be summarized as a method for creating maps using in the classic manner one or more information sensors (3), said sensors being placed on mobile platforms (60, 61, 62, 63) that move in order to collect the measurements necessary to create said maps associated with the utilization of means (71, 72, 73, 74, 75) for receiving the information/data (observation data) issuing from the mobile sensors and characterized by the utilization of a particular processing methodology that is the subject matter of the method of the invention, with:

receiving means that can be disposed randomly and autonomously relative to one another and transmit the received information to a particular so-called "random" computer processing layer (200), the random processing layer (200), that is to say the connection topology of the computers (80, 81, 82, 83, 84) composing it whereof is deemed variable and unknown, creates, in a dispersed manner and intentionally as and when measurements are available in the network of computers, so-called "random" submaps (90, 91, 92, 93, 94). The random submaps (the formulation of which is independent of the sensor) are dispersed in any manner in the random processing layer, an organizing layer (100) performing the statistical reconstruction of the required map or maps (21, 22) using pointers (110, 111) of the random submaps.

One embodiment of the method of the invention therefore comprises:

A series of sensors carried by mobile platforms onboard vehicles such as cars, airborne means (platforms) or spacecraft (namely satellites), the number of which can typically be between 2 and 1,000 inclusive, each sending their measurements by means of radio waves. The sensors may advantageously consist of photographic imaging cameras digitally transmitting by radio the photos obtained as and when they move toward receiving stations the number of which may typically be between 2 and 200 inclusive.

The method may equally apply to imaging optical sensors such as digital cameras or passive or active radiofrequency sensors intended to observe any observation zone including the terrestrial surface.

Reception systems distributed randomly and not necessarily fixed. They are positioned to profit from the best possible conditions in terms of layout (for example the technical or human environment). In a typical embodiment of the invention the reception systems may consist of radiofrequency receiving terminals disposed along a road or in the case of airborne or space sensors mobile antennas pointed toward the platform hosting the measurement sensor or sensors.

There can be as many reception systems distributed in any manner as are necessary to reduce the transmission bandwidths (whereas in the Y or X topology the bandwidths are not shareable between the reception systems).

To profit from this random receiving arrangement, the mobile platforms themselves can store the captured information very temporarily in order to wait to be in range of one of the receiving means.

An embodiment may be envisaged utilizing radiofrequency receiving antennas with diameters appropriate to the quantity of data to be received, which conditions the data rate of the information transmitted. In the case of sensors carried by satellites in low Earth orbit transmitting a radiofrequency power of 20 Watts, a mobile antenna with a diameter of 2 meters is typically necessary to receive 200 Mbit/s transmitted from a satellite at 600 km altitude.

A so-called "random" processing layer generating asynchronously and dynamically submaps consisting of sets of measurements available locally at a given time by one of the computers constituting it.

In the device utilizing the method of the invention, said processing network, which can be shared with other users and its physical organization are not deemed known or stable (therefore random). As and when available, each constituent element of the network will process the data issuing from any of the receiving stations.

The first processing means available creates within it a cartographic mini-mosaic termed a "random submap". Where this is stored is not known either but the means to access it are nevertheless public. This submap is not the result of the acquisition process but the result of an intentional random breaking down characteristic of the invention.

All these mosaics are entirely dispersed at random (except that each of the systems openly publishes the access keys to the random submaps as and when they are produced).

No processing system is associated with any particular receiving means or with a given geographical coverage. In fact only the information as to availability of the random "submap" is accessible, and not the measurements that they contain, which continue to be stored in a distributed and diffuse manner throughout the random processing network. In the case of an embodiment of the invention, the processing layer consists of computers connected in networks by a computer data bus. Said computers being connected or disconnected in any and potentially variable manner.

The method of the invention can also utilize a network of computers connected via the Internet and sharing their resources like computer systems known in the computing prior art by the term "cloud computing".

At any given moment, the number of random submaps created in this way can typically be between 10 and 100,000,000 inclusive.

An organizing layer intended to group by accumulating them the pointing data identifying the sparse information contained in the submaps stored asynchronously with respect to one another in the random processing structure of the network of the processing layer. This means that reconstruction keys necessary for the creation of a perfect map are then available provided that time is allowed for the system to finish by processing all of the measurements coming from the receiving means. Using pointers makes it possible to be able to access any submap without necessarily knowing its computer location within the processing system. For example, through a creation date number and from the geographical position of the random submap may be used as an access key. To effect the reconstitution of a final map, it suffices to give a series of numbers describing the positions of the contours of the required map that is compared to the list of the pointers generated by the processing layer in order to select the random submaps concerned that can be repatriated as and when they are processed and available within the processing system.

Thanks to the use of random submaps it is not necessary to know the location and the characteristics of each submap randomly created. According to one of the embodiments of the invention it suffices to combine them systematically to obtain the required map in a variable time depending on the performance of the network.

Through the use of an organizing layer (100) producing random submaps by statistical combination (110, 111) in the end it is as if the result obtained described a perfect map made up of multiple "submaps" initially dispersed randomly but grouped by virtue of the fact that their referencing within the statistically distributed processing structure is always available, and by simple stochastic accumulation any maps can be produced automatically. In contrast to the deterministic methods utilized at present in the "Y" or "X" topologies, this method makes it possible to create a given map without having to consider the manner in which the submaps are created or organized with respect to one another.

By creating random submaps by an intentional breaking down process and in a dispersed manner as and when the measurements are available in the network of computers, the result obtained, although random, is perfectly effective and reconstructs the required map in a manner that is necessarily correct but in a timeframe that cannot be determined in advance because it depends on the deemed unknown performance of the distributed processing system.

The technological consequence is important because the method of the invention utilizing statistical accumulation is by design tolerant of the topology of the computer means utilized, which can vary without limit without this affecting the final result.

The present method may be considered a novel application of concepts inspired by known Monte-Carlo mathematical methods (in which instead of measuring the response of a system in relation to a known excitation combines the responses of said system to a multitude of random excitations the combination of which yields the result) transposed unexpectedly and inventively to an information receiving and management topology utilizing statistical properties of sets of random "submaps" intentionally created to be recombined with one another after processing.

In the case of industrial applications the methodology proposed by the present invention basically profits from the new information technologies that offer distributed computer services at advantageous cost where the processing configurations are indeed deemed unknown.

According to one embodiment of the invention the stochastic accumulation of the random submaps may optionally be utilized to enhance the measurements by averaging or selecting the freshest measurements in order continuously to create refreshed maps.

This feature must not be confused with the statistical enhancement of an image taken by a sensor repeatedly over the same area. In the case of the invention the production of random submaps creates micromaps that can be the subject of fine accumulation (for example to process a gap in a cloud) that no classic method can localize.

Another method stemming from the invention makes it possible to enhance the maps produced in order continuously to profit from the advantages linked to the statistical accumulation of the submaps. One example concerns the improvement of the signal-to-noise ratio of a series of redundant submaps by statistical enhancement (the square root of the number of juxtaposed submaps or for applications for production of geographical maps or the elimination of clouds by a simple process of elimination on the fly of submaps containing measurements covering cloudy areas.

The method that is the subject matter of the present invention allows the rapid and practical creation of systems for creation of maps of large areas that can extend to the total or partial coverage of the terrestrial globe utilizing information issuing from airborne or space sensors utilized without it being necessary to coordinate their movements. It is possible to reconstruct any map automatically and on demand by simple accumulation of the measurements and utilizing distributed computer resources creating submaps randomly. This is particularly beneficial in that a system like the Internet makes available powerful means of which the implantation is not predictably known, however.

In this context the present invention proves particularly effective when implemented in a virtual and massively powerful Internet system as proposed commercially under the name "cloud computing". In this case using the method of the invention makes it possible considerably to reduce the costs of present day airborne or space cartographic processing systems.

Another feature of the method consists in allowing the cohabitation of a plurality of mobile sensor systems used for the production of maps. In this version of the method of the invention the random submaps are from a plurality of mobile sensor systems effecting different measurements that it is wished to combine with one another in the final map to be produced. Using the process of creation of random submaps, it is easy and sufficient to perform a statistical accumulation of the various submaps to obtain a composite map.

Advantageously an application of the invention to the production of a map of a continent or even of the entire planet utilizing a receiving and processing layer distributed worldwide in order to create by utilization of random submaps a final map covering the entirety of the terrestrial globe.

To this end the information sensors of one or more moving platforms cover a given area of the Earth and all of the corresponding information is burst randomly and as and when available into submaps representing variable fractions of the surface covered in this way.

Randomly and as and when this information is available, the random processing layer creates random submaps representing variable fractions of the surface covered in this way.

According to the method of the invention the production of a map of this kind to a scale of $1/100,000$ from metric resolution satellite data typically scanning the whole of the Earth in six months can typically be effected in less than one week. This is approximately five to ten times faster than with the methods used at present in the current prior art in which all the data necessitates centralization and linking of the data received by the satellites that is very costly in terms of transmission and manipulation time.

The invention claimed is:

1. A method for creating maps, in particular of the Earth, from measurements issuing from one or more information sensors, said sensors being placed on moving mobile platforms, wherein said measurements issuing from said information sensors are sent from said mobile platforms to receiving means disposed randomly and autonomously with respect to one another and transmitting the received information to a particular so-called "random" computer processing layers comprising a network of computers;

said random processing layer, in which the connection topology of the computers constituting it is deemed variable and unknown, creates within it so-called "random" submaps as and when information received by the network of computers is available, said random submaps being dispersed in said random processing layer, access pointers being associated with said random submaps to enable them to be retrieved;

an organizing layer uses the access pointers for statistical recombination of said random submaps dispersed in said random processing layer in order to reconstruct the required final map or maps, wherein said information sensors comprise optical sensors or passive radio-frequency sensors (radiometers) or active radio-frequency sensors (radar) or photographic imaging cameras.

2. The method as claimed in claim 1, wherein said organising layer accumulates said random submaps by continuous statistical composition in order to enable the use of dispersed computer means, the connection topology of which is not deemed to be known.

3. The method as claimed in claim 1, wherein stochastic accumulation of said random submaps is employed to enhance the final map either by averaging the random submaps or by selecting the freshest or those free of clouds.

4. The method as claimed in claim 1, wherein the number of mobile platforms is between 2 and 1,000 inclusive, the number of receiving means between 2 and 200 inclusive, the number of random submaps created between 10 and 100,000,000 inclusive.

5. The method as claimed in claim 1, wherein said random processing layer is implemented by cloud computing.

6. The method as claimed in claim 1, wherein the moving information sensor or sensors of one or more platforms cover(s) a given area of the Earth and all the corresponding information is burst randomly as and when available into submaps representing variable fractions of the area covered in this way.

7. The method as claimed in claim 1, wherein data received by the receiving means is randomly broken down into submaps with variable dimensions able to contain from 100 to 100,000,000 measuring points.

8. The method as claimed in claim 1, wherein the number of random submaps is between 10 and 1,000,000 inclusive.

9. The method as claimed in claim 1, wherein said mobile platforms are chosen from the list comprising: terrestrial vehicles, airborne and/or space platforms, namely satellites.

10. The method as claimed in claim 1, wherein said random submaps issue from a plurality of information sensor systems effecting different measurements to be combined with one another in the final map to be produced.

11. The method as claimed in claim 1, wherein said receiving means are distributed worldwide in order to create a map covering the entirety of or a significant fraction of the terrestrial globe.

12. The method as claimed in claim 1, wherein said information sensors effect scientific measurements intended to create maps in two, three or more dimensions.

* * * * *